United States Patent
Risser

(10) Patent No.: US 7,134,831 B2
(45) Date of Patent: Nov. 14, 2006

(54) LOW HEADROOM TELESCOPING BRIDGE CRANE SYSTEM

(75) Inventor: Philip E. Risser, Leola, PA (US)

(73) Assignee: Transol Corporation, Morgantown, PA (US)

( * ) Notice: Subject to any disclaimer, the term of this patent is extended or adjusted under 35 U.S.C. 154(b) by 474 days.

(21) Appl. No.: 09/896,987

(22) Filed: Jul. 2, 2001

(65) Prior Publication Data

US 2003/0002969 A1 Jan. 2, 2003

(51) Int. Cl.
*B60P 1/54* (2006.01)

(52) U.S. Cl. ............... 414/542; 212/74; 254/2 R

(58) Field of Classification Search ......... 414/539–540, 414/541, 542; 212/74, 224, 312, 230, 327, 212/326; 254/2 R, 4 R
See application file for complete search history.

(56) References Cited

U.S. PATENT DOCUMENTS

| | | | |
|---|---|---|---|
| 3,482,716 A | * 12/1969 | Leadley | 212/74 X |
| 4,297,071 A | * 10/1981 | Dunbar | 414/542 |
| 4,360,307 A | 11/1982 | Larsson | |
| 4,425,071 A | 1/1984 | Dunbar | |
| 5,062,760 A | 11/1991 | Samaniego | |
| 5,338,147 A | 8/1994 | Kucharczyk et al. | |
| 5,743,702 A | 4/1998 | Gunderson | |
| 6,126,379 A | 10/2000 | Feldman et al. | |

FOREIGN PATENT DOCUMENTS

| | | | |
|---|---|---|---|
| DE | 7507712 | 9/1975 | |
| DE | 4216709 | * 11/1993 | ........ 414/542 |
| DE | 4424655 | 1/1996 | |
| GB | 2202510 | 9/1988 | |
| GB | 2274094 | 7/1994 | |

OTHER PUBLICATIONS

Brochure entitled "MET–Track®" by Spanco, Inc.
European Search report corresponding to PC/US02/20057.

* cited by examiner

*Primary Examiner*—Eileen D. Lillis
*Assistant Examiner*—Michael Lowe
(74) *Attorney, Agent, or Firm*—Caesar, Rivise, Bernstein, Cohen & Pokotilow, Ltd.

(57) ABSTRACT

A telescoping bridge crane system arranged to be mounted over a floor of a structure, e.g., a vehicle trailer. The system includes a pair of enclosed mounting tracks for slidably supporting a runway frame. Trucks are located within the mounting tracks to move therein. Each truck includes a hanger. The runway frame also includes two enclosed tracks which are directly supported by the hangers so that they are located beside and parallel to the mounting tracks. A bridge section is mounted between the enclosed tracks of the runway frame by another pair of trucks.

13 Claims, 10 Drawing Sheets

LOW HEADROOM TELESCOPING BRIDGE CRANE SYSTEM

BACKGROUND OF THE INVENTION

This invention relates generally to material handling equipment, and more particularly to a telescoping bridge crane system particularly arranged to be mounted over a floor of a structure, e.g., in the interior of the body of a truck, to provide maximum headroom between it and the floor of the structure.

Various bridge crane systems and devices are commercially available for use in over-the-road vehicles, such as trailer bodies, vans, trucks, and the like to enable the vehicle to be loaded and unloaded. For example, some devices and systems make use top running bridges mounted within the trailer adjacent the ceiling. In order to extend out of the trailer such bridges make use of hinged runways which are arranged to be held within a stowed position within the interior of the trailer body, and then to fold out of the rear of the trailer so that a portion extends beyond the end of the trailer to facilitate the loading and unloading of the trailer. This approach limits the storage space within the trailer in order to maintain clearance for the movement of the folding runway. It also requires a set-up procedure before the system is ready for use.

So-called "enclosed track" bridge crane systems solve the problem of load-lifting coverage beyond the runway and bridge envelope by utilizing telescoping bridges or runways each formed of an elongated hollow track section. In particular, at least one enclosed track is mounted horizontally at an elevated position and includes at least one wheel truck or trolley arranged to roll therein. The truck(s)/trolley (s) serve to suspend another enclosed track horizontally below the upper track. The lower enclosed track can be extended longitudinally with respect to the upper enclosed track, i.e., the truck(s)/trolley(s) can be rolled along the upper track from a stowed or a retracted position within the upper track to an extended position (also within the upper track but closer to its rear end). This action enables the lower track to be extended substantially beyond the rear end of the upper track section. A hoist or other lifting member can be mounted directly or indirectly on the lower track to enable the lifting of some load. Examples of such bridge crane systems are commercially available under the trademark MET-TRACK® Stand Alone Workstation Bridge Cranes from Spanco, a division of Transol Corporation, the assignee of the subject application.

While the use of upper and lower enclosed tracks requires no additional set-up, it nevertheless also results in the loss of valuable headroom, particularly if the system is utilized in a confined space, such as within a trailer or other hollow vehicle body. Moreover, such telescoping or runways must be located directly below the fixed (upper) track or runway to prevent moment loading on the truck(s)/trolleys supporting the lower track or runway, since such trucks/trolleys are not typically amenable for supporting moment loads.

Examples of other types of prior art devices and systems for enabling a vehicle body to be loaded and unloaded are also found in U.S. Pat. Nos. 4,360,307 (Larsson), 4,425,071 (Dunbar), 5,062,760 (Samaniego), 5,338,147 (Kucharczyk et al.), 5,743,702 (Gunderson), and 6,126,379 (Feldman et al.).

While the aforementioned prior art devices and systems may be suitable for their intended purposes they never the less leave much to be desired from one or more standpoints, e.g., taking up considerable headroom in the interior of the vehicle, complexity, cost, ease of operation, ability to handle loads extending substantially beyond the bounds of the vehicle interior, etc.

SUMMARY OF THE INVENTION

This invention entails a system, e.g., a low headroom telescoping bridge crane system, for suspending a load over a floor, e.g., the floor of a vehicle, such as a truck body, or a static structure, such as a building. The system comprises a first, second, third, and fourth elongated, enclosed, hollow tracks, plural elongated cross members, a plurality of trucks (e.g., wheeled carriages), and a plurality of generally U-shaped hangers. Each of the tracks includes a longitudinally extending slot. Each of the hangers has a downwardly extending leg, an intermediate section and an upwardly extending leg.

The first and second tracks are disposed parallel to each other over the floor. The third and fourth tracks are also disposed parallel to each other and are interconnected by at least one of the cross members to form a runway frame. A first one of the trucks is located within the first track and arranged to move along the interior of the first track. A second one of the trucks is located within the second track and arranged to move along the interior of the second track. The first truck is connected to a downwardly extending leg of a first of the hangers, with a portion of the first hanger passing through the slot in the first track, and with the upwardly extending leg of the first hanger being connected to the third track to support the third track beside and parallel to the first track. The second truck is connected to a downwardly extending leg of a second of the hangers, with a portion of the second hanger passing through the slot in the second track, and with the upwardly extending leg of the second hanger being connected to the fourth track to support the fourth track beside and parallel to the second track, whereupon the runway frame is disposed horizontally between the first and second tracks and can be slid in a horizontal plane from a retracted position to an extended position and vice versa.

In accordance with one exemplary embodiment of this invention two trucks are located in each of the first and second tracks to support respective portions of the third and fourth tracks making up the runway frame. In addition, a bridging section is provided extending between the third and fourth tracks of the runway frame and is supported from movement therealong by a pair of trucks located within the third and fourth tracks of the runway frame. A hoist or other lifting member may be mounted on the bridging section.

DETAILED DESCRIPTION OF THE PREFERRED EMBODIMENT

Figure 1:
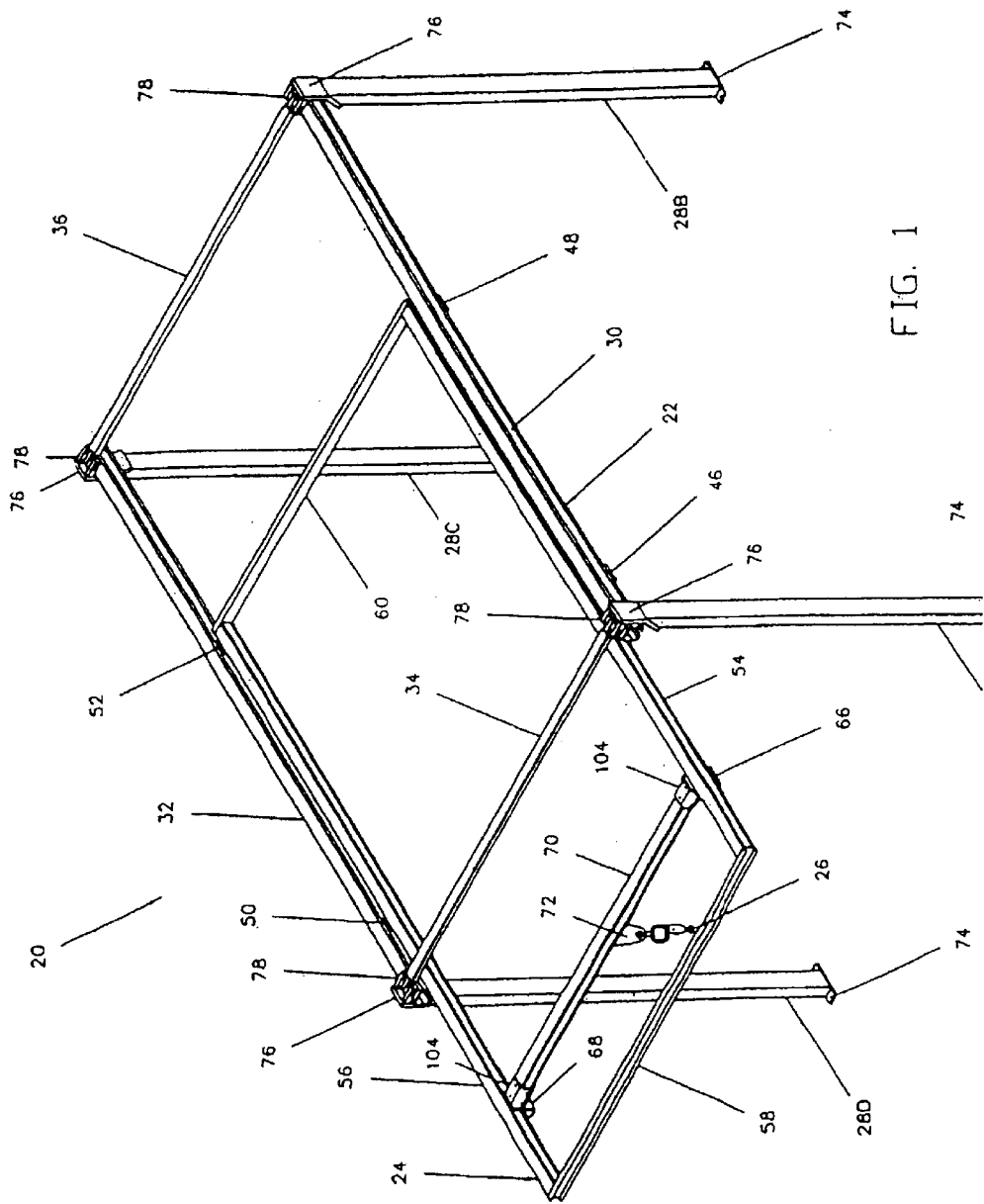
FIG. 1 is an isometric view of a system for suspending a load over a floor, which system can be mounted within the interior of the hollow body of a vehicle, such as a truck, van, trailer, etc., or within a static structure, such as a building, or at an outside location, such as within a work-yard, and the system in its extended position to enable a load to be lifted externally of the vehicle's body to be carried into the body or lifted internally and carried externally.

In FIG. 1 there is shown one exemplary embodiment of a low headroom telescoping bridge crane system 20 constructed in accordance with the subject invention. The system 20 makes use of a pair of elevated runways for supporting an extendable retractable runway frame therebetween, with the runway frame carrying a bridge section on which a conventional "end-effector" or a "below-the-hook" lifting device, such hoist, balancer, vacuum lifter, etc. is mounted. The system 20 has particularly suitability for mounting or disposition within the hollow body of a vehicle, e.g., in an over-the-road trailer, a truck, a van, etc., to facilitate the loading and unloading of the vehicle's body. However, it must be pointed out at this juncture that the system 20 can also be used in a static environment, e.g., within a building, in a yard or other open area, etc. To that end, the subject invention can be used in any application which requires low headroom and reach beyond the envelope of the system to lift and maneuver loads thereat. In mobile environments, such as when the system 20 is used in a truck or van body like shown in FIG. 10 (and which will be described later), the system is mounted so that its runways and the supported runway frame assembly are located in the same plane immediately adjacent the ceiling or roof of the vehicle's hollow body, e.g., the trailer. This low headroom arrangement provides maximum space between it, the lifting device suspended from the bridge section of the runway frame assembly, and the floor of the structure in which the system is mounted.

Figure 4:
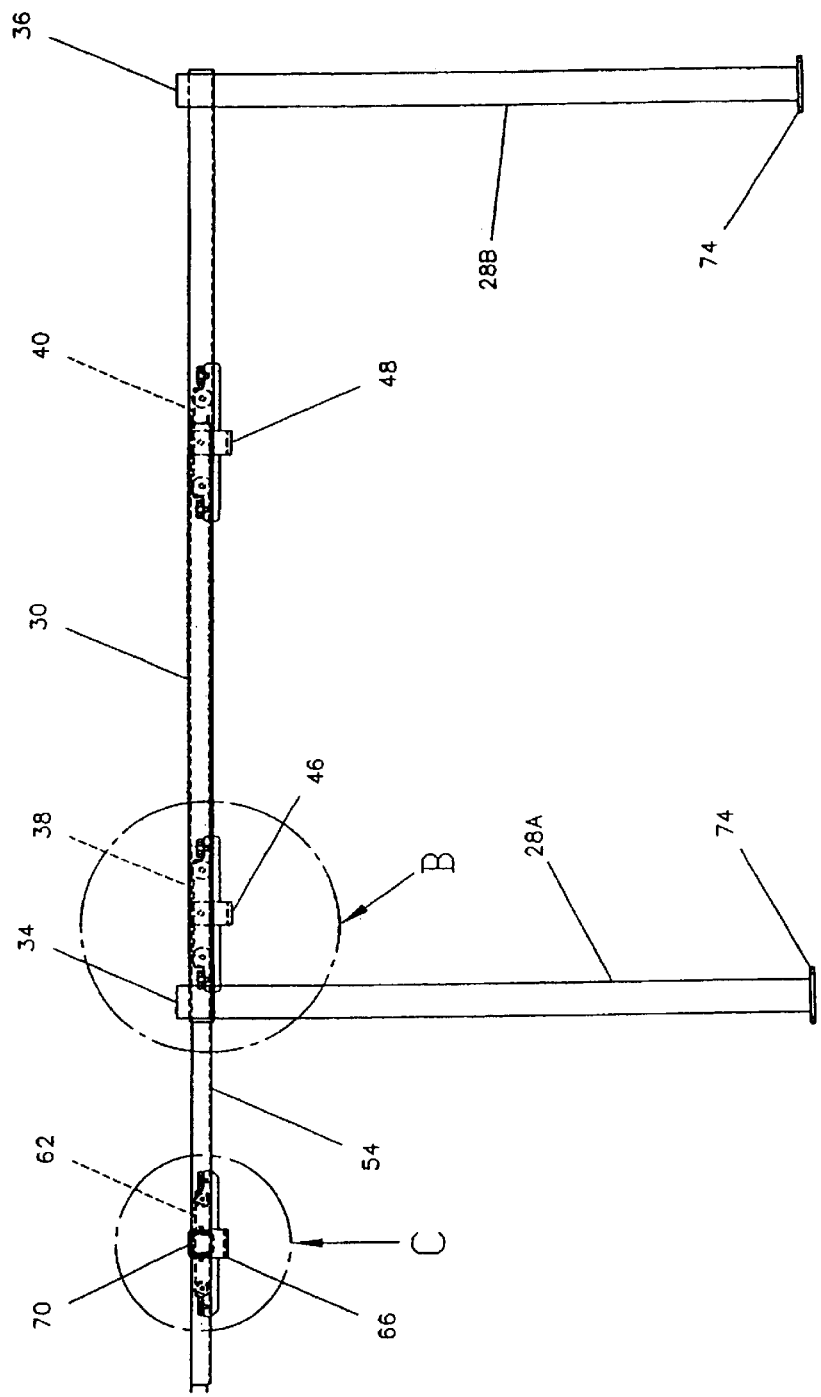
FIG. 4 is a side elevational view of the system shown in FIG. 1.

As best seen in FIG. 1, the system 20 basically comprises support frame assembly 22, including the pair of heretofore mentioned runways, the heretofore mentioned runway frame assembly 24, and a conventional lifting device, e.g., hoist 26. In the exemplary embodiment shown herein, the support frame assembly 22 comprises plural, e.g., four, upright support columns or posts 28A, 28B, 28C, and 28D, a pair of outside tracks 30 and 32, plural, e.g., two, cross members 34 and 36, plural, e.g., four, trolleys or trucks 38, 40, 42, and 44 (FIGS. 4 and 7) and associated hangers 46, 48, 50, and 52. The outside tracks 30 and 32 make up the heretofore identified pair of runways and are arranged to slidably support the support frame assembly 24 therebetween.

The runway frame assembly 24 comprises a pair of inside tracks 54 and 56, plural, e.g., two, cross members 58 and 60, a pair of trolleys or trucks 62 and 64 (FIGS. 6 and 7), a pair of hangers 66 and 68 (FIGS. 2 and 6), and a bridge section 70. The bridge section 70 serves to support, e.g., suspend, the lifting device 26 therefrom, and in the exemplary embodiment shown herein is in the form of an enclosed track (to be described later) including a trolley 72 from which the lifting device 26 is suspended.

The two outside tracks 30 and 32 forming the system's runways are disposed parallel to each other and in the same elevated horizontal plane by the plural, hollow support columns 28A, 28B, 28C, and 28D. As mentioned earlier the outside tracks (runways) serve to support the runway frame assembly 24 between them and in the same plane as the outside tracks 30 and 32. The mounting of the runway frame assembly 24 between the outside tracks 30 and 32 is effected by use of the trucks/trolleys 38, 40, 42, and 44 and the associated hangers 46, 48, 50, and 52, respectively. When so mounted the runway frame assembly 24 is arranged to be slid down the runways 30 and 32 between a retracted position (to be described in detail later) wherein the runway frame assembly is located within the "envelope" of the mounting frame assembly 22 (i.e., the cross members 34 and 36) and a fully extended position (also to be described later) wherein a portion of the runway frame assembly is located beyond the "envelope" of the mounting frame assembly, and vice versa. In fact, the runway frame assembly can be located at any intermediate position between the retracted and fully extended positions.

Figure 7:
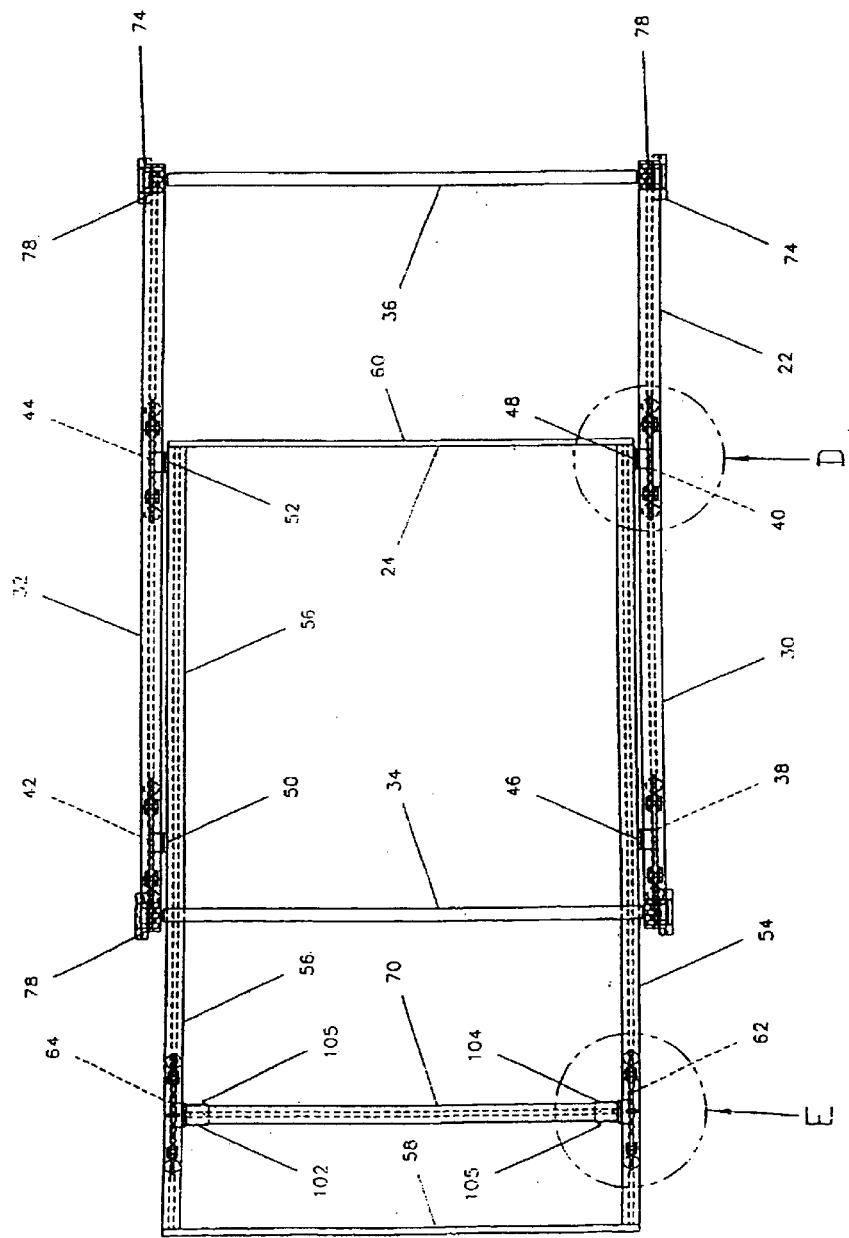
FIG. 7 is a plan view of the system shown in FIG. 1.
Figure 8:
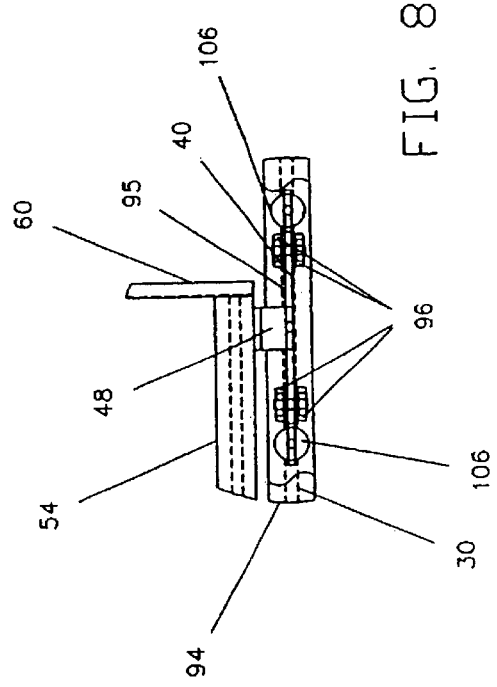
FIG. 8 is an enlarged plan view of a portion of the system shown within the circular area "D" in FIG. 7.

As best seen in FIGS. 1 and 7 the bridging section 70 is mounted transversely with respect to the inside tracks 54 and 56 via the trolleys 62 and 64, respectively, and their associated hangers 66 and 68, respectively, so that the bridging section can be located at any longitudinal position along the tracks 54 and 56.

As mentioned earlier, the support columns 28A, 28B, 28C, and 28D are arranged to support the runways 30 and 32 at the elevated horizontal position. In accordance with the exemplary embodiment shown herein each of the support columns is of identical construction and is in the form of an elongated linear hollow member formed of any suitable strong material, e.g., steel. Each member includes a flanged lower end in the form of a base plate 74 for mounting the column in a vertical orientation on the floor of the vehicle body or on any other surface, e.g., the floor of a building or the ground of a yard, in which the system 20 is to be located. The upper end of each support column includes an angular connector flange 76 to which a horizontal support yoke 78 is fixedly secured, e.g., welded. As will be described shortly, each horizontal support yoke 78 is arranged to suspend a portion of an associated one of the outside tracks 30 and 32 below it and to enable the tracks to be adjusted with respect to each other to maintain their parallelism. In addition, each yoke supports a respective end of an associated cross member 34 or 36. To that end, each yoke includes a pair of spaced apart arms which are fixedly secured, e.g., welded, to an associated end of an associated cross member 34 or 36.

Figure 2:
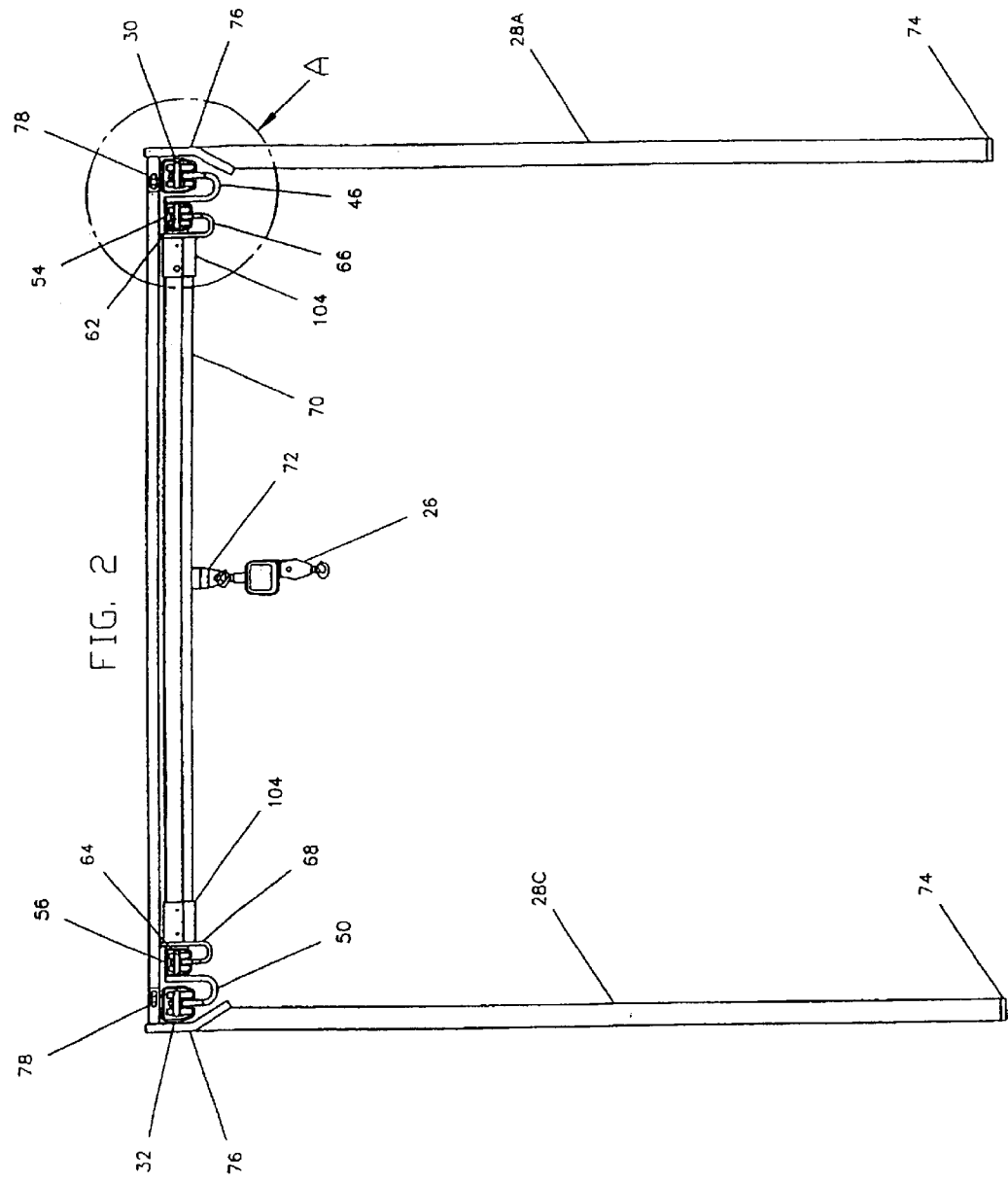
FIG. 2 is an enlarged end view of the system shown in FIG. 1.
Figure 3:
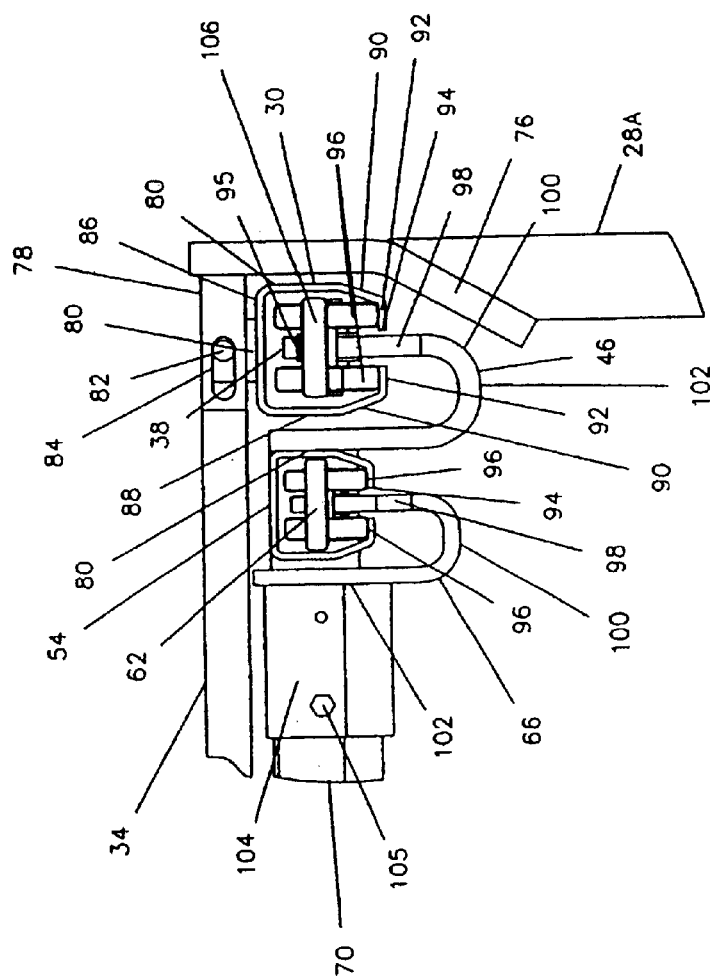
FIG. 3 is a front elevational view of a portion of the system shown within the circular area "A" in FIG. 2.

As best seen in FIGS. 2 and 3, the cross member 34 is fixedly secured between the horizontal support yokes 78 on the columns 28A and 28C, while the cross member 36 is fixedly secured between the horizontal support yokes on the columns 28B and 28D (FIG. 1). The securement of the ends of the cross members to their respective yoke arms is accomplished by welding or some other attachment means, e.g., rivets, threaded fasteners, etc.

The cross members 34 and 36 are preferably mounted as close as possible above the outside tracks 30 and 32 to minimize the system's headroom. To that end, each support yoke 78 includes a hollow interior space between its arms in which a slidable hanger member 80 is located and suspended. Each slidable hanger member 80 comprises a short height bar or rod disposed vertically and having a pair of rod-like arms 82 projecting horizontally therefrom in opposed diametric directions. Each of the arms 82 is located within a respective horizontally disposed elongated slot 84 in the pair of spaced arms making up the horizontal support yoke to enable the slidable hanger member 80 to be slid to any longitudinal position along the slot 84. The lower end of each slidable hanger member 80 is fixedly secured (e.g., welded) to the top wall (to be described hereinafter) of a portion of one of the two outer tracks 30 and 32 to suspend that track from the support yoke immediately below it. Thus, the runway track 30 or 32 to which the hanger member 80 is secured is disposed and supported immediately below its associated cross frame member. Since each slidable hanger member 80 can be slid along the associated slots 84 in its associated yoke 78 the spacing between the two outside tracks 30 and 32 can be adjusted as desired. This enables the user of the system 20 to ensure that the tracks 30 and 32 are maintained parallel to each other, since any skewing of those tracks could interfere with the smooth sliding of the runway frame assembly 24 therebetween.

In the exemplary embodiment shown in FIG. 1, the columns 28B and 28D are located at the far ends of the two outside tracks 30 and 32 to support those ends of the tracks via their associated yokes and hangers. The other columns 28A and 28C are located at the near ends of the two outside tracks 30 and 32 to support those ends of the tracks via their associated yokes and hangers. It should be noted at this juncture that while the system 20 is shown in FIG. 1 as comprising four support columns, the system can make use of more or less such members to support the outside tracks at the elevated horizontal position, depending upon the length of the tracks and other matters, e.g., the amount of additional bracing that is utilized, etc.

Turning now to FIGS. 1–3 the details of each of the outside tracks 30 and 32 will now be discussed. As can be seen each track is of a conventional "enclosed-type" construction. One particularly suitable enclosed track is that sold by Spanco, a division of Transol Corporation, the assignee of this invention, under the trademark Met-Track®. Each track 30 and 32 is an elongated member, formed of a strong material, e.g., steel, having a horizontally disposed top wall 86, a pair of vertical sidewalls 88 projecting downward from the top wall, a pair of angularly located sidewalls 90 located below the vertical sidewalls 88, and a pair of horizontally disposed flanges 92 projecting inward from the ends of the angularly located sidewalls 88 to form a slot 94 therebetween. Each track 30 and 32 is arranged to receive at least one truck/trolley (to be described hereinafter) to slidably support the runway frame assembly 24 between the tracks. In the exemplary embodiment the trucks/trolleys 38 and 40 are located within the interior of the outside track 30, while the trucks/trolleys 42 and 44 are located within the interior of the other outside track 32. All of the trucks/trolleys 38, 40, 42, and 44 are of the same construction and will be described in detail later. Suffice it for now to state that each basically comprises a movable body member 95 having plural wheels or rollers 96 which are arranged to roll on respective inner surfaces of the flanges 92 on opposite sides of the slot 94 in the track in which the trolley is mounted. In accordance with one preferred exemplary embodiment of this invention each of the trucks is of conventional construction, such as that sold by Spanco, a division of Transol Corporation, as part of the MET-TRACK® system.

As mentioned earlier, each truck/trolley includes a hanger secured thereto. Each hanger is a generally U-shaped member which serves as the means for supporting a portion of the associated inside tracks 54 and 56 of the runway frame assembly 24. To that end, as best seen in FIG. 3, the hanger associated with each truck/trolley mounted in an outside enclosed track basically comprises generally a U or J-shaped member having a first downwardly extending leg section 98, a transversely extending, e.g., arcuate, intermediate section 100, and an upwardly extending leg section 102. The downwardly extending leg section is mounted on the trolley body 95 so that it extends downward through the slot 94 in the enclosed track. Accordingly, when the truck/trolley rolls along the flanges of that track, the downwardly extending section 98 does not bear against either edge of the flange forming the slot 94. Each hanger is of a rigid construction and formed of a strong material, e.g., steel. The outer surface of each of the upstanding leg portions 102 of each hanger 38–44 is fixedly secured, e.g., welded, to a respective portion of a respective one of the inside track sections 54 and 56 forming the runway assembly 24. As best seen in FIG. 3, each track of the runway frame assembly 24 is of the same general shape as the externally located enclosed tracks 30 and 32 of the support frame assembly, but is of slightly smaller cross-sectional area. In the interest of brevity, the portions of the runway frame assembly tracks will be given the same reference numerals as the runway tracks 30 and 32. The outside downwardly extending vertical wall 80 of each of the runway assembly tracks 54 and 56 is secured to the outer surface of the upstanding end or leg portion 102 of each of the hangers connected to the trolleys in the outside enclosed track sections 30 and 32 so that the tracks 54 and 56 of the runway frame assembly are located parallel to and beside (inside) the outside enclosed tracks 30 and 32, respectively, i.e., at virtually the same height with respect to the floor.

Figure 6:
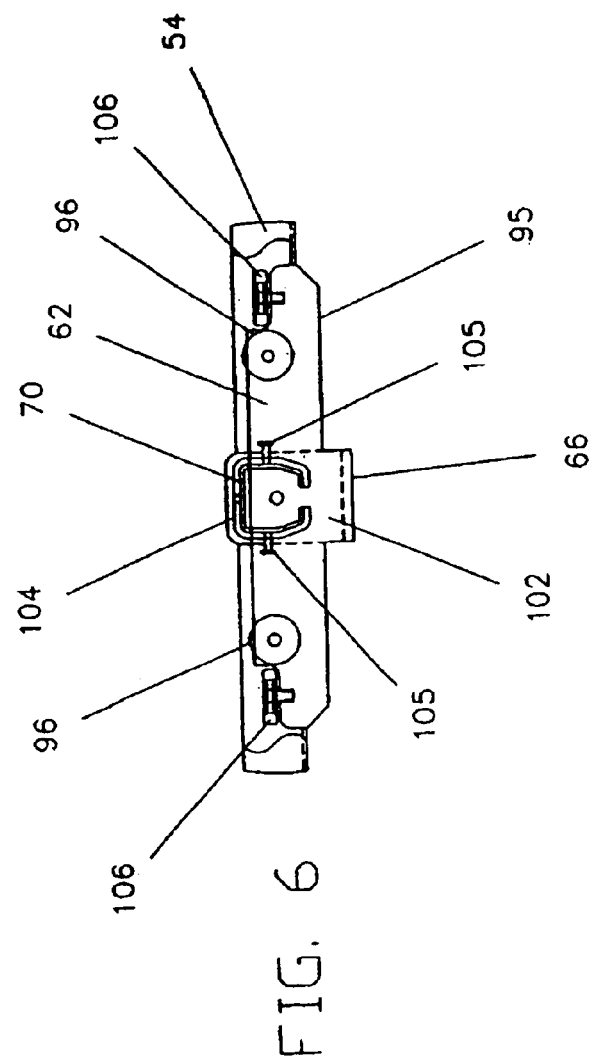
FIG. 6 is an enlarged side elevational view of a portion of the system shown within the circular area "C" in FIG. 4.
Figure 9:
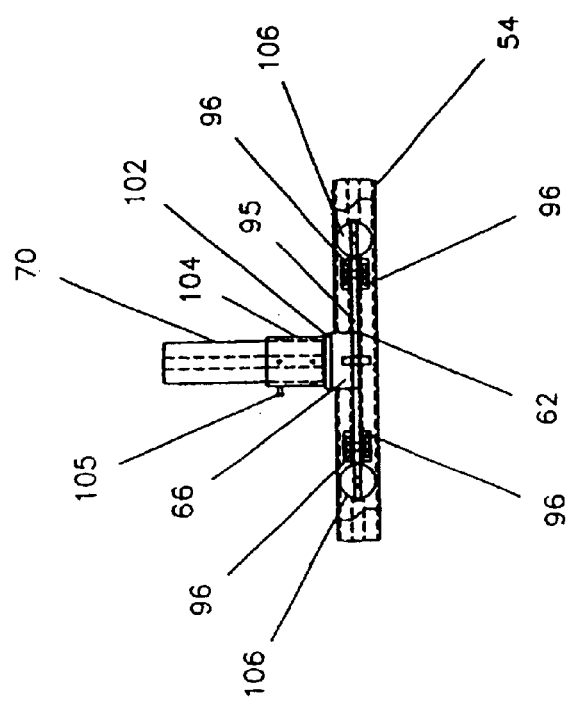
FIG. 9 is an enlarged plan view of a portion of the system shown within the circular area "e" in FIG. 7.

Each of the enclosed tracks 54 and 56 of the runway frame assembly includes a single truck/trolley located therein. Thus, track 54 includes truck/trolley 62 and track 56 includes truck/trolleys 64. The truck/trolleys 62 and 64 of the runway are similar in construction to the truck/trolleys of the outside tracks 30 and 32 except that they are slightly smaller in size to fit within the smaller tracks. Thus each trolley includes plural rollers 96, and a body 95 from which a generally U or J-shaped hanger extends. Truck/trolley 62 supports hanger 66 therefrom, whereas truck/trolley 64 supports hanger 68 therefrom. Each hanger 66 and 68 is identical in construction to the heretofore identified hangers and will be given the same reference numerals in the interest of brevity. Thus, as can be seen in FIGS. 6 and 9, the upwardly extending leg 102 of hanger 66 is fixedly secured to a bracket or connector 104 at one end of the bridging section 70. The connector is a hollow member which is fixedly secured (e.g., welded) to the leg section 102 of hanger 66. One end of bridge section 70 is located within the connector 104 and is held in place by plural bolts 105 (FIG. 6). The bridging section 70 as noted above is an elongated, hollow frame-like member, e.g., an enclosed track like those of the runways 30 and 32, but of smaller cross sectional area. At the opposite end of the bridging section is another bracket or connector 104 which is also fixedly secured to the upwardly extending leg portion 102 of the hanger 68 connected to the truck/trolley 64 in the other enclosed track 56 of the runway frame assembly.

Figure 5:
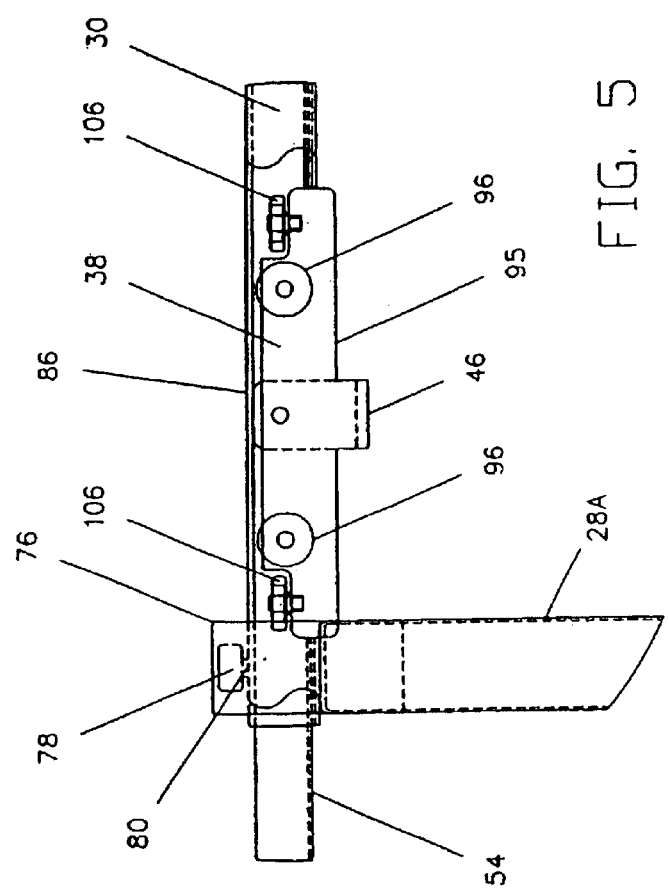
FIG. 5 is an enlarged side elevational view of a portion of the system shown within the circular area "B" in FIG. 4.

In FIGS. 5 and 6, the details of the various trucks/trolleys of the system 20 can best be seen. Thus, as can be seen in FIG. 5, the truck/trolley 38 which is located within the enclosed track 30 closest to the end cross member 34 basically comprises a body 95 having four rollers or wheels 96 mounted thereon (two on each side of the body) on horizontally disposed axles. Two of the wheels 96 are located to run along the inside surface of the flange 92 of the outer wall of that track while the opposite two wheels roll along the upper surface of the opposed flange. In order to keep the truck/trolley 38 centered within the enclosed track 30 so that the hanger 46 does not rub against the edges of the slot 94 while the truck/trolley rolls therealong, the truck/trolley includes a pair of horizontally disposed idler or centering rollers or wheels 106 mounted at opposed ends of the body 95. Each wheel 106 is mounted on an axle oriented vertically so that each wheel is disposed in a horizontal plane. The diameter of the wheels is such that each makes contact with the opposed inner surfaces of the two vertically extending walls 80 and 88 of the enclosed track 30. The other truck/trolley 40 in the enclosed track 30 is similarly constructed and arranged. The trolleys 42 and 44 of the other enclosed outside track 32 are also constructed in the same manner.

The trucks/trolleys 62 and 64 of the runway frame assembly 24 and which are located in the enclosed tracks 54 and 56 are of identical construction to the trucks/trolleys 38–44 except that they are of slightly smaller size. In the interest of brevity, the same reference numbers are given to the same parts of the trucks/trolleys 62 and 64 are given to the trucks/trolleys 38–44.

As mentioned earlier, the bridging section also preferably includes a trolley 72 therein for movably supporting a hoist or any other type of lifting mechanism 26 through the slot in the bottom of the track. The trolley 72 can be similar in construction to those described heretofore or can be of any other conventional construction. Thus, the hoist 26 can be moved to any longitudinal position along the length of the enclosed track forming the bridging section 70.

Figure 10:
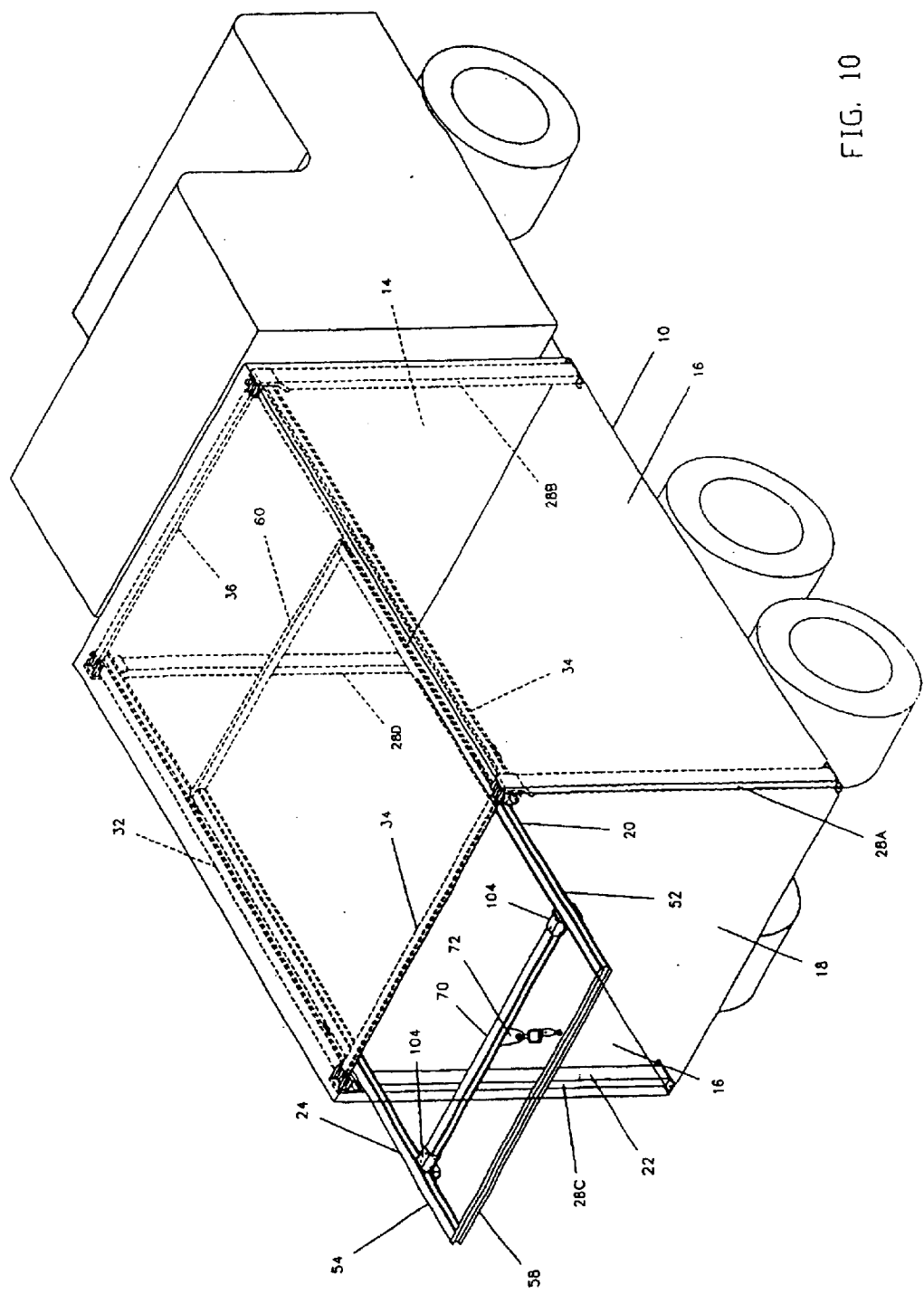
FIG. 10 is an isometric view of a vehicle, e.g., a truck, having the system of FIG. 1 located in its body.

Turning now to FIG. 10 there is shown the exemplary embodiment of a system 20 of this invention mounted within the hollow body 10 of a truck or van. The body 10 includes a top wall 12, a front wall 14, a pair of side walls 16, a floor 18, and a rear wall in the form of one or more openable doors (not shown). The system is mounted in the body 10 so that its support columns 28A–28D are secured to the floor 18. In the embodiment shown the support column 28B is located immediately adjacent the side wall 6 towards the front wall 14, the support column 28A is located immediately adjacent the side wall 16 towards the open rear wall, the support column 28D is located immediately adjacent the opposite side wall 16 towards the front wall 14, and the support column 28C is located immediately adjacent that side wall 16 towards the open rear wall. It should be pointed out at this juncture that the embodiment 20 shown makes use of four support columns and two cross members. That is merely exemplary. Thus, the system 20 can make use of one or more support columns for the runways, depending upon the type of loads to be handled, the length of the runways, the amount of bracing provided, etc.

As will be appreciated by those skilled in the art, when the system 20 is mounted within the hollow interior of a vehicle body as just described, the runway frame assembly 24 can be moved from any retracted position within the envelope of the support frame assembly 22, to any extended position, wherein some portion of the runway frame assembly extends beyond the open rear end of the vehicle body. Depending upon the length of the inside track members, the runway frame assembly can be extended out of the rear of the truck body a substantial distance (e.g., almost equal to half the length of the runway frame assembly itself). With special construction it could extend even further. Since the bridging section 70 can be moved to any longitudinal position on the runway frame assembly, the lifting device 26 that is suspended by the trolley 72 from the bridging section 70 can be precisely positioned at any distance beyond the rear of the body 10, up to the end of runway frame assembly. Moreover, the trolley 72 can be located to any position along the length of the bridging section. Thus, a load to be readily lifted into the truck body from virtually any position outside at the rear of the truck body. So too, a load can be lifted from virtually any position within the truck body and then the runway frame extended out of the truck body to a desired position and the bridging section and the hoist-supporting trolley can be moved to any position to deposit the load to virtually any position beyond the rear of the truck body. The runway frame assembly 24 can then be moved back to its retracted position for stowage.

It should be pointed out at this juncture that the system 20 need not be mounted by support columns, but can itself be suspended by any suitable means from a ceiling or other structure so that the runway tracks and the runway assembly disposed therebetween is at any desired horizontal position. Moreover, the runway tracks 30 and 32 and the runway frame assembly tracks need not be of the enclosed type. Thus each track may be of an I-beam or some other shape to support a trolley or truck to slide/roll therealong. So, too, other types of carriers can be used in lieu of the trolleys/trucks to extend/retract the runway frame assembly between the runway tracks.

Without further elaboration the foregoing will so fully illustrate my invention that others may, by applying current or future knowledge, adopt the same for use under various conditions of service.

I claim:

1. A system for suspending a load over a floor, said system comprising a first, second, third, and fourth elongated, enclosed, hollow tracks, plural elongated cross members, a plurality of trucks, and a plurality of generally U-shaped hangers, each of said tracks including a longitudinally extending slot, each of said hangers having a downwardly extending leg, an intermediate section and an upwardly extending leg said downwardly extending leg and said upwardly extending leg being parallel to each other, said first and second tracks being disposed parallel to each other over the floor, said third and fourth tracks being disposed parallel to each other and interconnected by at least one of said cross members to form a runway frame, a first one of said trucks being located within said first track and arranged to move along the interior of said first track, a second one of said trucks being located within said second track and arranged to move along the interior of said second track, said first truck being connected to said downwardly extending leg of a first of said hangers, with a portion of said first hanger passing through said slot in said first track, said upwardly extending leg of said first hanger being connected to said third track to support said third track immediately adjacent beside said first track whereupon said first and second tracks are coplanar, said second truck being connected to said downwardly extending leg of a second of said hangers and an elongated bridge member adapted to have the load coupled thereto for suspending the load over the floor, said elongated bridge member being connected between said third and fourth tracks and being coplanar therewith, with a portion of said second hanger passing through said slot in said second track, said upwardly extending leg of said second hanger being connected to said fourth track to support said fourth track immediately adjacent beside said second track, whereupon said second and fourth tracks are coplanar, said runway frame is being disposed horizontally between said first and second tracks and being coplanar therewith, said runway frame being arranged to be slid in a horizontal plane from a retracted position to an extended position and vice versa.

2. The system of claim 1 additionally comprising a third truck located within said first track, a third hanger connected to said third truck, a fourth truck located within said second track, and a fourth hanger connected to said fourth truck, said third truck being connected to said downwardly extending leg of said third hanger, with a portion of said third hanger passing through said slot in said first track, said upwardly extending leg of said third hanger being connected to said third track, said fourth truck being connected to said downwardly extending leg of said fourth hanger, with a portion of said fourth hanger passing through said slot in said second track, said upwardly extending leg of said fourth hanger being connected to said fourth track.

3. The system of claim 2 wherein said elongated bridge member is connected transversely between said third and fourth tracks.

4. The system of claim 3 additionally comprising fifth and sixth trucks, and fifth and sixth hangers, and wherein said elongated bridge member comprises a pair of ends, said fifth truck being located within said third track and arranged to move along the interior of said third track, said fifth truck being connected to said downwardly extending leg of said fifth hanger, with a portion of said fifth hanger passing through said slot in said third track, said upwardly extending leg of said fifth hanger being connected to one of said ends of said bridge member, said sixth truck being located within said fourth track and arranged to move along the interior of said fourth track, said sixth truck being connected to said downwardly extending leg of said sixth hanger, with a portion of said sixth hanger passing through said slot in said fourth track, said upwardly extending leg of said sixth hanger being connected to the other of said ends of said bridge member, whereupon said bridge member can be slid in a horizontal plane to various longitudinal positions along said runway frame.

5. The system of claim 4 wherein each of said trucks includes plural wheels for rolling along the interior of the track in which it is located.

6. The system of claim 1 wherein said elongated bridge member is connected transversely between said third and fourth tracks.

7. The system of claim 6 additionally comprising fifth and sixth trucks, and fifth and sixth hangers, and wherein said elongated bridge member comprises a pair of ends, said fifth truck being located within said third track and arranged to move along the interior of said third track, said fifth truck being connected to said downwardly extending leg of said fifth hanger, with a portion of said fifth hanger passing through said slot in said third track, said upwardly extending leg of said fifth hanger being connected to one of said ends of said bridge member, said sixth truck being located within said fourth track and arranged to move along the interior of said fourth track, said sixth truck being connected to said downwardly extending leg of said sixth hanger, with a portion of said sixth hanger passing through said slot in said fourth track, said upwardly extending leg of said sixth hanger being connected to the other of said ends of said bridge member, whereupon said bridge member can be slid in a horizontal plane to various longitudinal positions along said runway frame.

8. The system of claim 7 wherein each of said trucks includes plural wheels for rolling along the interior of the track in which it is located.

9. The system of claim 1 wherein each of said trucks includes plural wheels for rolling along the interior of the track in which it is located.

10. The system of claim 1 additionally comprising plural upstanding posts for supporting said first and second tracks above the floor.

11. The system of claim 1 wherein said system is arranged to utilized with a vehicle, said vehicle including a hollow body bounded by plural upstanding walls, a ceiling, a floor, and an openable entry thereto, said system being arranged to be mounted within said hollow body immediately adjacent the ceiling to provide maximum clearance space between said system and the floor.

12. The system of claim 11 wherein said runway frame is arranged to be extended out of the openable entry in the hollow body of the vehicle.

13. The system of claim 1 additionally comprising a hoist mounted on said elongated bridge member for suspending the load over the floor.

* * * * *